(12) United States Patent
Cook et al.

(10) Patent No.: US 9,244,448 B2
(45) Date of Patent: Jan. 26, 2016

(54) SERVICEABILITY STRATEGY FOR MACHINE CONTROL SYSTEM

(71) Applicant: Caterpillar Inc., Peoria, IL (US)

(72) Inventors: Jarrod J. Cook, Washington, IL (US); Melissa A. McTavish, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 13/762,924

(22) Filed: Feb. 8, 2013

(65) Prior Publication Data

US 2014/0229033 A1 Aug. 14, 2014

(51) Int. Cl.
*G06K 7/01* (2006.01)
*G05B 19/00* (2006.01)

(52) U.S. Cl.
CPC ...................................... *G05B 19/00* (2013.01)

(58) Field of Classification Search
CPC combination set(s) only.
See application file for complete search history.

(56) References Cited

U.S. PATENT DOCUMENTS

| 7,356,394 | B2 | 4/2008 | Burgess |
| 8,395,478 | B2 * | 3/2013 | Diab et al. ................... 340/5.81 |
| 8,700,252 | B2 * | 4/2014 | Ubik et al. ................... 701/29.1 |
| 2007/0296552 | A1 | 12/2007 | Huang et al. |

* cited by examiner

*Primary Examiner* — Rami Khatib
(74) *Attorney, Agent, or Firm* — Baker & Hostetler LLP

(57) ABSTRACT

A system and method for controlling a machine is provided. For example, the method includes coupling removeably, at an on-board controller module of a machine, a first identification device, reading, using a reader in the on-board controller module, a code stored in the first identification device, receiving, at the on-board controller module, a wireless message including another code from a control console, comparing, using a processor in the on-board controller module, the code with the received another code, and processing, using a processor coupled to the reader, the wireless message based on the comparing to determine pairing with a second external wireless identification device of a control console to the machine if the code and the received another code match.

8 Claims, 3 Drawing Sheets

SERVICEABILITY STRATEGY FOR MACHINE CONTROL SYSTEM

TECHNICAL FIELD

The present disclosure relates to machine control systems and methods. More particularly, the present disclosure relates to serviceability strategy for machine control systems and arrangements thereof.

BACKGROUND

Conventionally, machines may be remotely controlled using a control system. Such conventional control system may include a remote control console that communicates with a controller module on-board a machine. The controller module on-board the machine is conventionally hard-coded at the supplier's factory to contain a unique identifier (ID) code. This ID code allows only a remote control console that has knowledge of the same ID code to communicate with the on-board controller module, for example, to remotely control the machine. Once the ID codes at the remote control console and the on-board controller module are paired, other remote control-controller module pairs in the same area are ignored by the pair that has matched ID codes. However, in conventional machine control systems, if one of these two devices fail (e.g., the remote control console), both devices have to be replaced to maintain pairing, since the IDs are not programmable by the end-user for each device. Unfortunately, this requires the end-user to spend money replacing a device which was not defective to begin with to make sure that the new devices are also paired through their respective hard-coded ID codes.

Further, other solutions use user-replaceable chips, containing the ID code, which reside inside the on-board controller module. This requires the end-user to open up the on-board controller module to replace the ID chips. However, having the end-user open the device is problematic. For example, such an act of opening may introduce additional defects. Furthermore, opening the on-board controller module may void warranties. Having hard-coded IDs prevents the end-user from installing on-board transceivers on multiple machines and choosing which machine to control via one remote control console. In some conventional systems, for example, as discussed in U.S. Patent Application Publication No. 2007/0296552, a single radio frequency identity tag associated with an appliance is placed upon/within the appliance. However, when placed on the appliance (e.g., as a sticker), the tag is prone to peeling off or getting lost. If this tag is lost or is damaged, a remote control cannot gain knowledge about the appliance, let alone have the ability to control the appliance. Therefore, conventional serviceability strategies for machine control systems are expensive and inflexible.

SUMMARY

One aspect of the present disclosure provides a control system. The control system includes a first and a second identification device storing a first and a second identification code, respectively, a control console, and an on-board electronic controller module of a machine to which the first identification device is removeably coupled externally. The on-board electronic controller module includes a first identification device reader to read the first identification code, and a first processor, coupled to the first identification device reader. The first processor is adapted to receive the first identification code from the first identification device reader, receive a first wireless message, including the second identification code, from a control console, compare the first and second identification codes, and process the first wireless message if the first and second identification codes match.

Another aspect of the present disclosure provides a remote control system for a machine. The remote control system includes an identification device storing a first identification code, and a controller module. The controller module includes an identification device reader to read the first identification code stored on the identification device, and a processor coupled to the identification device reader. The processor is adapted to receive the first identification code from the identification device reader, receive a wireless message, including a second identification code from a control console, compare the first and second identification codes, and process the message if the first and second identification codes match.

Yet another aspect of the present disclosure provides an identification device. The identification device is removeably coupled externally to an on-board electronic controller module of a machine. The identification device has a code stored thereupon to form a unique pair with another identification device of a control console outside the machine. The control console is adapted to control the machine remotely upon a verification of the code to form the unique pair.

A further aspect of the present disclosure provides a machine control method for controlling a machine. The method includes coupling removeably, at an on-board controller module of a machine, a first identification device, reading, using a reader in the on-board controller module, a code stored in the first identification device, receiving, at the on-board controller module, a wireless message including another code from a control console, comparing, using a processor in the on-board controller module, the code with the received another code, and processing, using a processor coupled to the reader, the wireless message based on the comparing to determine pairing with a second external wireless identification device of a control console to the machine if the code and the received another code match.

DETAILED DESCRIPTION

Figure 1:
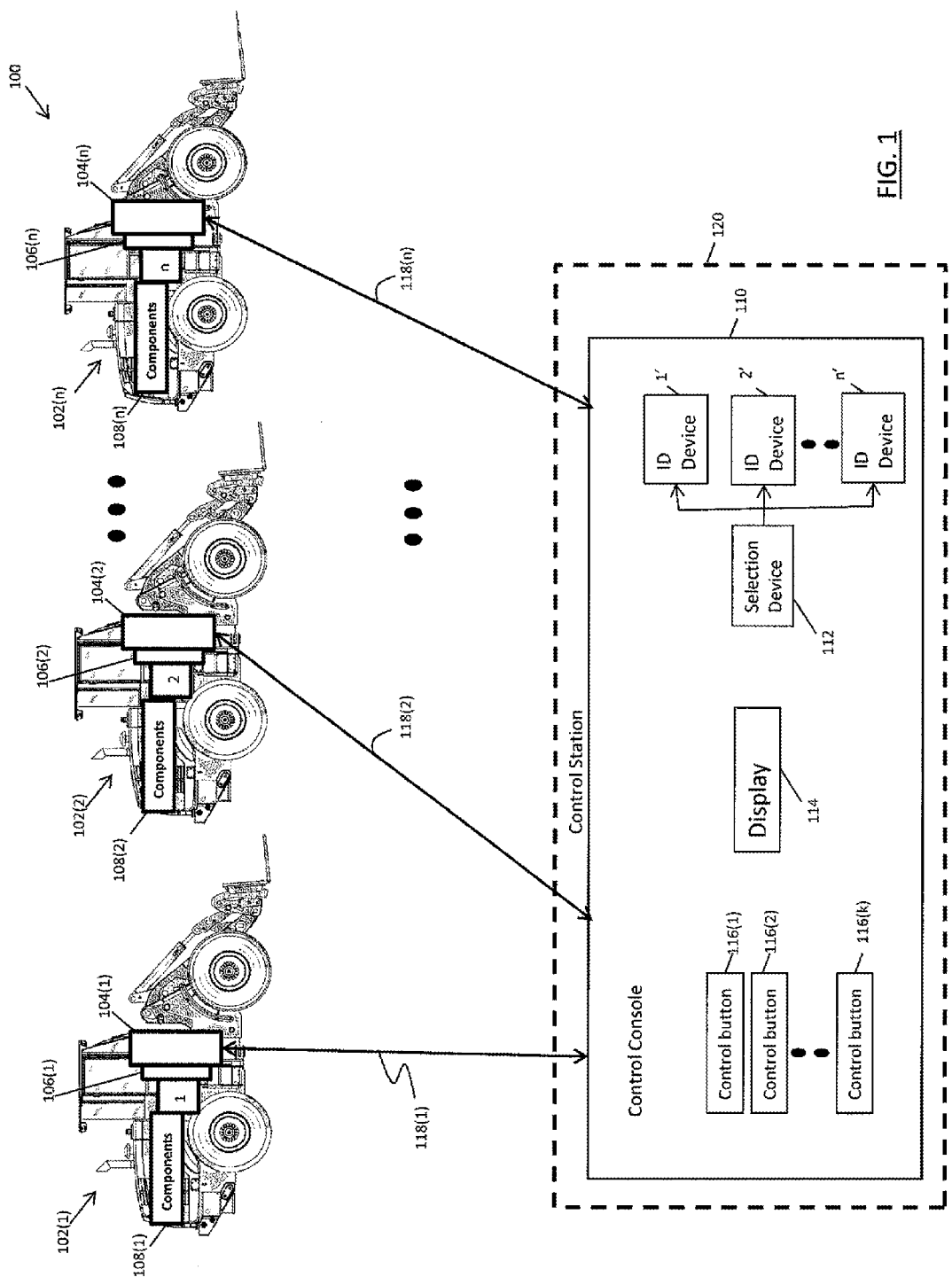
FIG. 1 is an exemplary environment having a control system, in accordance with an embodiment.

The disclosure will now be described with reference to the drawing figures, in which like reference numerals refer to like parts throughout.

FIG. 1 presents an example environment for a control system 100, in accordance with an embodiment of the present disclosure. Examples of such an environment may include without limitation, a construction site, or a mining site. The environment, or a part thereof, may be an indoor, an outdoor, a marine, a terrestrial, an extra-terrestrial, a sub-terrestrial, an atmospheric, or an exospheric environment depending on specific applications in which control system 100 may be used. Control system 100 includes a plurality of machines 102(1)-102(n), where index 'n' is a positive integer value, and a control console 110. For example, control system 100 may include only one, only two, or more than two machines 102

(1)-102(*n*). Control system 100 may include a control station or control room 120 that houses control console 110. Machines 102(1)-102(*n*) are in communication with control console 110. Such communication is depicted by messages 118(1)-118(*n*) in control system 100. By way of example only and not by way of limitation, messages 118(1)-118(*n*) may be wireless messages at one or more frequencies. Further, although control system 100 is illustrated to show only one control console 110, additional control consoles and/or control stations may be present.

Machines 102(1)-102(*n*) may be electrical, mechanical, electro-mechanical, or other types of machines. By way of example only and not by way of limitation, machines 102(1)-102(*n*) may be motor graders, wheel loaders, wheel dozers, track type tractors, track loaders, robotic devices, etc. An example of such machines 102(1)-102(*n*) may include D-10® or D-11® series of machines provided by Caterpillar, Inc. of Peoria, Ill.

Machines 102(1)-102(*n*) respectively include on-board electronic controller modules 104(1)-104(*n*), slots 106(1)-106(*n*) on an external surface or interface of on-board electronic controller modules 104(1)-104(*n*), and identification devices 1-*n* that may be removeably coupled to include on-board electronic controller modules 104(1)-104(*n*). One or more of machines 102(1)-102(*n*) may additionally include components 108(1)-108(*n*), respectively. It is to be noted that although the disclosure may refer to a single machine (e.g., machine 102(1)) and/or components thereof, the description herein is equally applicable to other machines and their respective components. For example, only machine 102(1) may be described below. However, such description is for discussion purposes only, and same description is applicable to other machines 102(2)-102(*n*) and their respective components.

Each of on-board electronic controller modules 104(1)-104(*n*), interchangeably referred to in singular as a "controller module," "on-board controller," "on-board controller module," or "on-board module," is an electronic device associated with each of machines 102(1)-102(*n*), respectively. The term "on-board" relates to controller modules 104(1)-104(*n*) being inside, or being physically attached to machines 102(1)-102(*n*), respectively. This is in contrast to a device being off-board, remote, or away from machines 102(1)-102(*n*), e.g., control console 110 that is physically separated from machines 102(1)-102(*n*) by a spatial distance. Further, the specific location or orientation of on-board electronic controller modules 104(1)-104(*n*) within/on machines 102(1)-102(*n*) is shown as an example only, and not as a limitation. In one embodiment, for example, on-board electronic controller module 104(1) is, or is coupled to, a joystick or a steering device. Such joystick or steering device may control an output of machine 102(1). In one embodiment, on-board electronic controller module 104(1) is a box attached to or inside machine 102(1). For example, on-board electronic controller module 104(1) is coupled to components 108(1). In one embodiment, on-board electronic controller modules 104(1)-104(*n*) may have dimensions of 133 mm (width)×119 mm (height)×76.2 mm (depth), although other sizes may exist. In one embodiment, on-board electronic controller modules 104(1)-104(*n*) are configured to support "J1939 CAN" message communications, known to one of ordinary skill in the art, with control console 110. Such J1939 messages may be part of messages 118(1)-118(*n*). Additional internal details of on-board electronic controller modules 104(1)-104(*n*) are discussed with respect to FIG. 2, using on-board electronic controller module 104(1) as an example.

On-board electronic controller module 104(1) may have a slot 106(1). Slot 106(1) may be a receptacle, a recess, a hook, a movable sliding surface, or any attachment device that is capable of coupling identification devices 1-*n* with on-board electronic controller module 104(1). Slot 106(1) may be integrable with an outside surface of on-board electronic controller module 104(1). In one embodiment, slot 106(1) may include mechanical latches or springs to removeably couple identification device 1 to on-board electronic controller module 104(1). Slot 106(1) enables insertion or attachment, and removal of identification device 1 externally to on-board electronic controller module 104(1). Due to such external coupling of identification device 1 at slot 106(1), identification device 1 is easily removable by a user or a technician of machine 102(1), without opening or dismantling on-board electronic controller module 104(1). For example, if on-board electronic controller module 104(1) needs replacement or servicing, then identification device 1 may be removed from slot 106(1) of on-board electronic controller module 104(1). A new or different on-board controller module may then couple to identification device 1 via its respective slot. Likewise, if identification device 1 needs replacement or servicing, slot 106(1) is arranged to externally release identification device 1. A new identification device may then be inserted or removeably coupled without opening or tampering on-board electronic controller module 104(1). In one embodiment, slot 106(1) is optional. For example, identification device 1 is attached to on-board electronic controller module 104(1) as a sticker or a fastening pad, e.g., a VEL-CRO® fastener provided by Velcro Industries B.V. of Manchester, N.H. Alternatively, slot 106(1) may be functionally replaced by any attachment device that externally couples identification device 1 removeably to on-board electronic controller module 104(1).

Identification device 1 is one of a unique pair of identification devices. The term "unique" relates to the fact that only two identification devices exist for each such pair. The second of this pair is coupled to control console 110. Likewise, identification devices 2-*n* are uniquely paired with corresponding identification devices on control console 110. In one embodiment, identification devices 1-*n* are passive devices. That is, such passive devices do not require an internal or external source of power for their operation, as known to one of ordinary skill in the art. Alternatively, identification devices 1-*n* may be active devices. When identification devices 1-*n* are active, they may include charging devices (e.g., batteries) and antennas for transmission of data stored on identification devices 1-*n*. In one embodiment, on or more of identification devices 1-*n* is a radio frequency identification (RFID) device. For example, identification device 1 may be an RFID tag or RFID chip that can be coupled to on-board electronic controller module 104(1) removeably at external slot 106(1), or at an external surface of on-board electronic controller module 104(1). Identification devices 1-*n* may include a ground plane layer, a dielectric layer, and an electronic component layer. These layers may be made, for example, of copper, silicon, dielectric material, or other suitable material known to one of ordinary skill in the art. In one embodiment, identification devices 1-*n* may have a protective covering or housing. In one embodiment, identification devices 1-*n* may each contain a unique code therein or thereupon. Such a code is interchangeably referred to as an "identifier," an "identification (ID) code," a "key," etc. For example, identification device 1 may have such a code embedded in the material constituting identification device 1. Such a code may be, for example, a bit sequence having an integer number of bits. In one embodiment, this code is hard-coded or "burnt" to identification device 1 at a foundry or factory where identification devices 1-*n* are made, with an exact same code on a corresponding separate identification device for the pair. The term "hard-coded" relates to the code being permanent in nature. Such a hard-coded ID code cannot be changed or programmed externally or internally. The code may be implemented as a series of physical patterns on the material of identification devices 1-*n* (e.g., imprinted silicon pattern). Such patterns forming the code are readable by on-board electronic controller modules 104(1)-104(*n*), as discussed with respect to FIG. 2. In an active identification device, such patterns may be formed using on or off states of an electronic storage medium (e.g., a flip-flop, a transistor, or a memory device) on identification devices 1-*n*. Additional internal details of identification devices 1-*n* are discussed with respect to FIG. 2, using identification device 1 as an example.

In an alternative embodiment, identification device 1 may be optional. For example, on-board electronic controller module 104(1) may receive code 202 over a wireless (e.g., radio frequency) channel or a wired channel from control console 110.

Components 108(1)-108(*n*) may be, or may include, a front frame and a rear frame, coupled together via an articulated hitch, a non-articulated mainframe (in the alternative), pair of articulated front wheels, a pair of tandem rear wheels, a single pair of rear wheels (in the alternative), a pair of track assemblies, a seat or operator cab, one or more windows, an engine compartment, one or more joysticks, control pods, foot pedals, operator displays in the operator cab, engine compartment housing an engine system, including an engine, an intake system, an exhaust system and an engine control system, as well as other engine support systems, such as, for example, a fuel system, a cooling system, a lubrication system, etc. Components 108(1)-108(*n*) may include a hydraulic system, including one or more hydraulic circuits, also housed within the engine compartment. The engine control system may include one or more microprocessor-based controllers that are coupled to the engine, intake and exhaust systems, as well as other support systems, and configured to control the function of these components. The cooling system may include a reservoir, a pump, a radiator and a hydraulic cooling fan coupled to, and powered by, a hydraulic circuit. Various hoses and lines connect the components of the cooling system to the engine. Components 108(1)-108(*n*) may further include a blade assembly coupled to a front portion of the front frame via a drawbar, and to a central portion of front frame via a linkage. Various hydraulic actuators, such as, for example, blade lift cylinders, blade side shift cylinder, blade pitch cylinder, circle rotation cylinder, drawbar center shift cylinder, etc., articulate blade assembly and the blade with respect to a ground in the environment. Optional work tools may include a ripper or scarifier attached to the rear frame of machines 102(1)-102(*n*), and a dozer blade or counterweight attached to the front frame of machines 102(1)-102(*n*). It is to be noted that although components 108(1)-108(*n*) are not explicitly shown, they are standard power or machinery components that may be present, installed, or added to machines 102(1)-102(*n*), as known to those skilled in the art.

Control system 100 includes control console 110. Control console 110 is interchangeably referred to herein as a "remote control console," "a remote console," or a "remote control." In one embodiment, control console 110 may be a joystick, or a part thereof, although other types of mechanical steering devices could be used. In one embodiment, control console 110 may be a hand-held mobile device (e.g., a remote control device). Control console 110 may receive user or operator inputs from one or more appendages of the operator, although other forms of user input (e.g., speech-based) mechanisms may be used additionally, alternatively, or optionally. An exemplary layout of control console 110 includes a display 114, a plurality of control buttons 116(1)-116(*k*), where index 'k' is a positive integer number, a selection device 112, and a plurality of identification devices 1'-*n*', where n' is a positive integer number ranging from 1 to ∞. Further, index n' may or may not be equal to the index n used for identification devices 1-*n*. Identification devices 1'-*n*' may uniquely pair with identification devices 1-*n*, respectively or otherwise. In one embodiment, control console 110 may be provided with shoulder straps or other means for an operator to support the weight of control console 110 comfortably in an ergonomically safe manner. In one embodiment, for example, control console 110 is, or is coupled to, a joystick or a steering device. Such joystick or steering device may control an output of machine 102(1). In one embodiment, on-board electronic controller module 104(1) is a box attached to or inside machine 102(1), and, for example, is coupled to components 108(1). Internal arrangement and structural details of control console 110 are further discussed with respect to FIG. 2.

Identification devices 1'-*n*' are similar to identification devices 1-*n* of machines 102(1)-102(*n*). Identification devices 1'-*n*' are coupled to control console 110. By way of example only, such coupling may be in the form of a storage space (not shown) on control console 110, or one or more slots similar to slots 106(1)-106(*n*). Alternatively, identification devices 1'-*n*' may be electrically attached internally to circuitry inside control console 110. Although identification devices 1'-*n*' may be attached internally, they may be removable by opening control console 110. In one embodiment, each identification device 1'-*n*' forms the second identification device of a unique pair, the first such identification device of the unique pair being one of identification devices 1-*n*. For example, identification device 1 and identification device 1' may faun a unique pair, identification device 2 and identification device 2' may form another unique pair, and so on, although other alternative unique pairings may exist. The term "unique" relates to the fact that only two identification devices exist for each such pair. For example, both identification devices in a unique pair have the same ID code embedded therein. In one embodiment, identification devices 1'-*n*' are passive devices. That is, such passive devices do not require an internal or external source of power for their operation, as known to one of ordinary skill in the art. Alternatively, identification devices 1'-*n*' may be active devices. When identification devices 1'-*n*' are active, they may include charging devices (e.g., batteries) and antennas for transmission of data stored on identification devices 1'-*n*'. In one embodiment, one or more of identification devices 1'-*n*' is an RFID device. For example, identification device 1' may be an RFID tag or RFID chip. Identification devices 1'-*n*' may include a ground plane layer, a dielectric layer, and an electronic component layer. These layers may be made, for example, of copper, silicon, dielectric material, or other suitable material known to one of ordinary skill in the art. In one embodiment, identification devices 1'-*n*' may have a protective covering or housing. In one embodiment, ID code of identification device 1' may be a code embedded in the material constituting identification device 1'. Such a code may be, for example, a bit sequence having an integer number of bits. In one embodiment, this code is hard-coded at a foundry or factory where identification devices 1'-*n*' are made, with an exact code on corresponding identification devices 1-*n* for the pair. The term "hard-coded" relates to the code being permanent in nature. Such a hard-coded code cannot be changed externally or internally. The code may be implemented as a series of physical patterns on the material of identification devices 1'-n' (e.g., imprinted silicon pattern). Such patterns forming the code are readable by control console 110, as discussed with respect to FIG. 2. In an active identification device, such patterns may be formed using on or off states of an electronic storage medium (e.g., a flip-flop, a transistor, or a memory device) on identification devices 1'-n'. As noted above, index n' may or may not be equal to the index n used for identification devices 1-n. In other words, control console 110 may have only one, more than one, less than n, exactly n, or more than n number of identification devices 1'-n'.

Selection device 112 is an interface or user input device to select one of identification devices Selection device 112 is electrically or electro-mechanically coupled to one or more identification devices 1'-n'. Selection of one identification device out of identification devices 1'-n' is based upon which one of identification devices that uniquely pairs with a corresponding one of identification devices 1-n. Selection device 112 may be a capacitive sense push button, a mechanical or electro-mechanical rotatory dial, a key-pad or key-board, combinations thereof, or other type of passive or active selection switch known to one of ordinary skill in the art. In one embodiment, selection device 112 is optional when, for example, control console 110 includes only one identification device out of identification devices 1'-n' that is paired with its counterpart identification device, as discussed with respect to FIG. 3.

In one embodiment, control console 110 includes display 114. Display 114 is a liquid crystal display (LCD), although display 114 may be other types of display units known to one of ordinary skill in the art. Display 114 may be used to display various indicators, status, messages, photos, videos, etc. related to control system 100. For example, display 114 may indicate performance or live video of one of machines 102(1)-102(n) that is controlled by control console 110. Display 114, or a portion thereof, may display an overall setup of control system 100, for example, relative locations of machines 102(1)-102(n). In one embodiment, display 114 includes a section of the graphical display reserved to display four 7-segment outputs. The segments are controlled by messages 118(1)-118(n) (e.g., J1939 messages) sent to a receiver in on-board electronic controller modules 104(1)-104(n) using, for example, binary coded decimal (BCD) format. In one embodiment, during a power up of control console 110, three dashes may be displayed on display 114 until a message is received to update display 114. If, at any time, no message is received to update display 114 for five consecutive seconds, three dashes shall be displayed by display 114 until an update is received, although other time periods may be programmed.

Control buttons 116(1)-116(k) include various buttons as described herein. Although the term "buttons" is being used, this terms is intended to encompass any mechanical or electro-mechanical device (e.g., knobs or rotators) that may be used for the same functionality as the button themselves. Further, it is to be noted that the layout and functionalities of control buttons 116(1)-116(k) illustrated in FIG. 1 are for purposes of illustration, and other layouts, combinations, and functionalities of control buttons 116(1)-116(k) may be contemplated by one of ordinary skill in the art after reading the present disclosure. Like selection device 112, control buttons 116(1)-116(k) may be capacitive sense push buttons, mechanical or electro-mechanical rotatory dials, combinations thereof, or other type of passive or active selection switches known to one of ordinary skill in the art. In one embodiment, control console 110 may be manufactured in two or more parts to accommodate control buttons 116(1)-116(k) on two or more separate panels. Control buttons 116(1)-116(k) may be activated or deactivated to start or stop, respectively, transmission of control messages, e.g., in messages 118(1)-118(n). In one embodiment, control buttons 116(1)-116(k) may be implemented as a touch screen with graphical icons that can be selected by a user of control console 110.

In one embodiment, control button 116(1) on control console 110 is a physical switch to turn control console 110 on or off. For example, control button 116(1) may be accessed before a communication link (e.g., a radio frequency link) between control console 110 and one or more machines 102(1)-102(n) can be established.

In one embodiment, control button 116(2) on control console 110 is a horn actuator. For example, control button 116(2) may be a momentary push button, which when pressed, produces audio output from a speaker or a horn on machine 102(1).

In one embodiment, control button 116(3) in an implement lockout switch. For example, control button 116(3) may be a two-position switch with a locking feature that requires a user of control console 110 to lift the switch up before changing states. An upward force required to lift the switch may not exceed, for example, 13N. The switch may have an easy-to-grip mushroom-style top, for example.

In one embodiment, control button 116(4) may be a rotary knob to select engine speed during an idling of one or more machines 102(1)-102(n).

In one embodiment, control button 116(5) may be a light control switch.

In one embodiment, control button 116(6) may be an emergency shutdown switch. Control console 110 may send an immediate command to on-board electronic controller module 104(1) of machine 102(1) that is being controlled when control button 116(6) is activated so that immediate action may be taken to stop operation of machine 102(1).

In one embodiment, control button 116(7) may be an engine start switch for starting the engine one or more machines 102(1)-102(n).

In one embodiment, control button 116(8) may control a parking brake of machines 102(1)-102(n).

In one embodiment, control buttons 116(9)-116(12) may control a position of one or more machines 102(1)-102(n). Such position may be based, for example, on Cartesian coordinates (X-Y coordinates). Respective positions of machines 102(1)-102(n), or parts thereof, may be updated as they move and may be shown on display 114.

In one embodiment, control button 116(13) may be used to alter the engine speed of one or more machines 102(1)-102(n).

In one embodiment, control buttons 116(14) and 116(15) may be push buttons used to shift transmission gear in machines 102(1)-102(n) up or down, respectively.

In one embodiment, control button 116(16) may be used to control speed of machines 102(1)-102(n) based upon a grade of the terrain in which machines 102(1)-102(n) are being used.

In one embodiment, control button 116(17) may be a two-position fire suppressant toggle switch that may be engaged or disengaged to suppress any fire arising in machines 102(1)-102(n).

In one embodiment, control button 116(18) may be a paddle that is moved up or down from a center position to control service brakes of machines 102(1)-102(n).

In one embodiment, control button 116(19) may be an indicator that communicates to the operator of control console 110 whether or not a communication link between control console 110 and one or more machines 102(1)-102(n) has been established, and that corresponding messages 118(1)-118(n) are being exchanged.

Likewise additional control buttons 116(20)-116(k) may be used to carry out additional functionalities. By way of example only and not by way of limitation, such functionalities may include various status indicators for machines 102(1)-102(n), control of various components 108(1)-108(n), activation of different modes of operation for machines 102(1)-102(n), one or more alarms, speed selection options, etc., or other functionalities that are encountered for operation of machines 102(1)-102(n) by an operator. Further, functionalities of two or more control buttons 116(1)-116(k) may be combined into one. Activation or deactivation of control buttons 116(1)-116(k) is reflected in control signals in messages 118(1)-118(n) that are transmitted to on-board electronic controller modules 104(1)-104(n) of respective machines 102(1)-102(n) to control respective outputs thereof (e.g., movement of components 108(1)-108(n)).

Control station 120 may be arranged to house control console 110. For example, control station 120 may include a stationary or a mobile base station that provides protective accommodation for an operator or user of control console 110. Alternatively, control station 120 may be a console bigger than control console 110 that can seat one or more operators. In one embodiment, control station 120 may be a room with multiple control consoles similar to control console 110. Each multiple control console may be operated by operators in control station 120 for various sites similar to the environment of control system 100. In one embodiment, control station 120 is optional.

Figure 2:
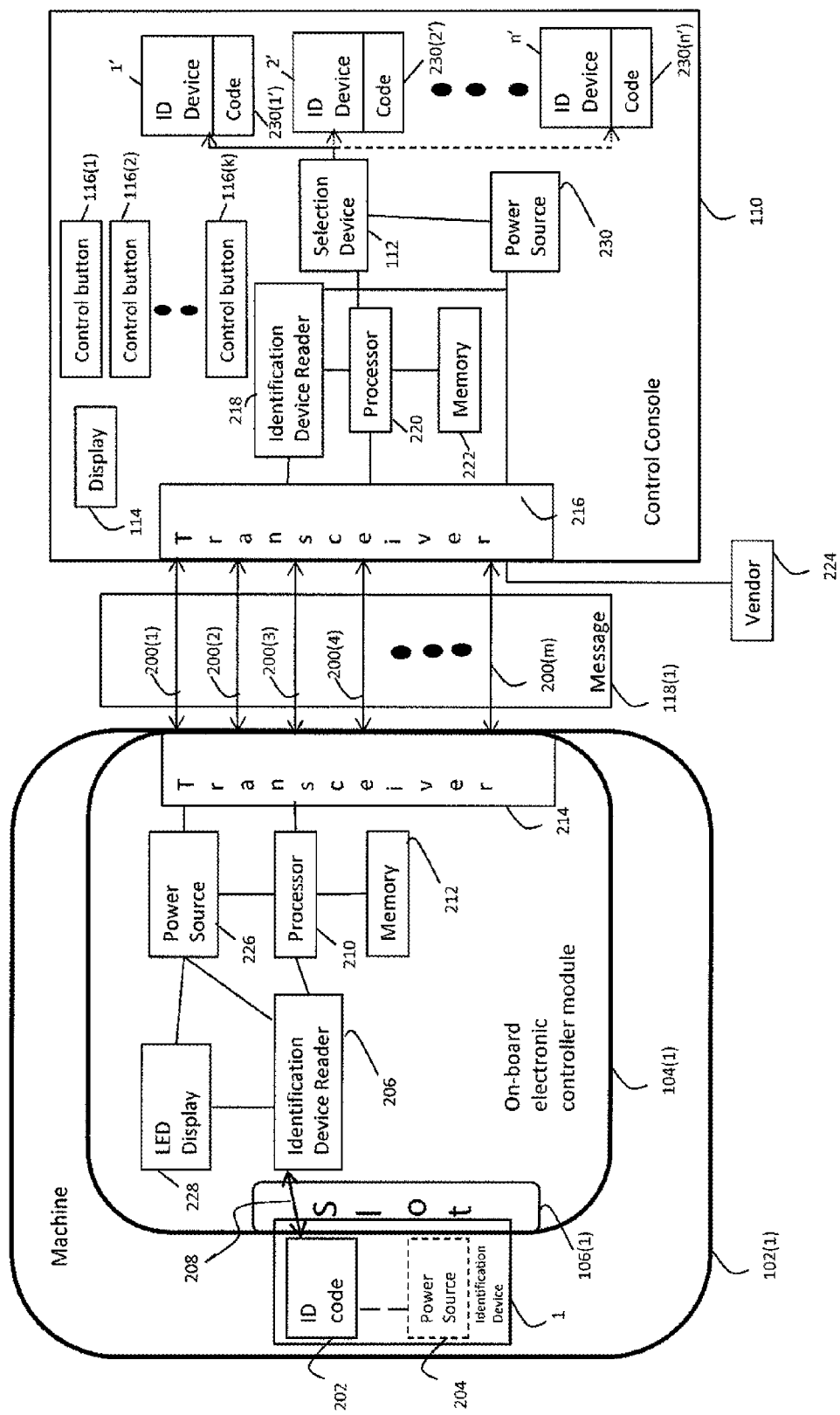
FIG. 2 is a schematic representation an identification device externally coupled to an on-board electronic controller module in communication with a control console, in accordance with an embodiment.

FIG. 2 illustrates internal details of identification devices 1-n (using identification device 1 as an example), internal details of on-board electronic controller modules 104(1)-104(n) (using on-board electronic controller module 104(1) as an example), composition of messages 118(1)-118(n) (using message 118(1) as an example), and internal details of control console 110, according to an embodiment of the present disclosure.

Identification device 1 is one of a unique pair of devices. Identification device 1 includes a code 202 that identifies the unique pair to which identification device 1 belongs. Code 202 is interchangeably referred to herein as an "identification (ID) code 202", a "first identification code 202", or a "first code 202". For example, code 202 is hard-coded onto identification device 1. Code 202 corresponds to a specific value or pattern. Same value or pattern of code 202 is hard-coded on another identification device (e.g., identification device 1') as another identification code (e.g., a second identification code 230(1')). For example, identification device 1 and identification device 1' form the first and second identification device of a pair of identification devices with same value or pattern of codes on each. In one embodiment, code 202 may be an x-bit binary value where 'x' is a positive integer. For example, code 202 may have an 8-bit binary value. In one embodiment, code 202 may be a physical pattern (e.g., imprinted on silicon) inside identification device 1. The physical pattern alters an incident electromagnetic or electro-acoustic wave from an external reader. In one embodiment, code 202 may be a permanent arrangement of magnetization states of dipoles inside identification device 1. Likewise, code 202 may be any form of a permanent state machine that is not programmable externally, but may be read externally to yield a numeric or an alphanumeric value. Code 202 is internal to identification device 1 such that any physical tampering of identification device 1 will render identification device 1 useless or damaged. As noted above, in one embodiment, identification device 1 is a passive device. Alternatively, identification device 1 may be an active device. When identification device 1 is an active device, it may optionally include a battery or a power source 204. In this example, code 202 may be transmitted by an antenna in/on identification device 1 to on-board electronic controller module 104(1). In one embodiment, identification device 1 may be an RFID chip or tag, an RFID memory card, a compact disc (CD) medium, or other types of permanent read-only memory media. Identification device 1 may optionally include an input-output interface (e.g., a universal synchronous bus (USB) interface) for insertion in slot 106(1). When an input-output interface is included, a security procedure may be implemented (e.g., a security authentication feature or an algorithm) that prevents a user from tampering with the code using the input-output interface. Alternatively, identification device 1 may be mechanically coupled externally to on on-board electronic controller module 104(1) at a receptacle or a casing thereupon. For example, identification device 1 may include pins on an external surface thereof for latching onto the receptacle. Regardless of how identification device 1 may be attached to on-board electronic controller module 104(1), identification device 1 is removable from on-board electronic controller module 104(1) without much effort and without requiring opening on-board electronic controller module 104(1). In this sense, identification device 1 is external to on-board electronic controller module 104(1). In one embodiment, code 202 may be read in a physically contactless manner by internal components of on-board electronic controller module 104(1). The term "contactless" relates to lack of hard wired electrical contact or connection between on-board electronic controller module 104(1) and identification device 1. Upon insertion or removable coupling to on-board electronic controller module 104(1) (e.g., via slot 106(1)), identification device 1 is ready to be accessed by on-board electronic controller module 104(1). For example, such access may include reading code 202 and/or other information from identification device 1 wirelessly without contact. The term "wirelessly" may relate to radio frequency (RF), infrared (IR), line of sight optical, or other contactless way of communicating information.

On-board electronic controller module 104(1) includes an identification device reader 206, a processor 210, a memory 212, an on-board transceiver 214, a power source 226, and a light emitting diode (LED) display 228, in addition to other electronic components such as connectors, relays, etc. These components of on-board electronic controller module 104(1) may be connected to each other via one or more internal buses, as illustrated by solid connecting lines.

In one embodiment, identification device reader 206 is configured to transmit a wireless signal 208 to identification device 1 to read code 202. Wireless signal 208 is modified by code 202. The modified wireless signal 208 is captured by identification device reader 206. For example, identification device reader 206 may be an RFID reader. This RFID reader transmits an RF signal to identification device 1. Code 202, by virtue of its physical presence, modifies the electromagnetic field of the RF signal. This modification is then deciphered by processor 210 coupled to identification device reader 206 to reveal a value of code 202. Internal circuitry of identification device reader 206 is known to those of ordinary skill in the art, and will not be described herein. Alternatively, when identification device 1 is an active device, code 202 may be wirelessly transmitted to on-board electronic controller module 104(1), e.g., to identification device reader 206.

Processor 210 is a general purpose processing unit, e.g., a microprocessor. Processor 210 may be configured, adapted, or programmed to receive and process read code 202 from identification device reader 206 at one of its input lines or pins. In addition processor 210 may be configured, adapted, or programmed to carry out additional steps. Processor 210 may execute one or more instructions stored in memory 212, or received via message 118(1), which cause it to carry out or perform various features and functionalities of embodiments in this disclosure, e.g., operations discussed with respect to FIG. 3. By way of example only and not by way of limitation, processor 210 may be an INTEL® PENTIUM® processor provided by Intel, Inc. of Santa Clara, Calif.

Memory 212 is coupled to processor 210. In one embodiment, memory 212 stores only one code read by identification device reader 206 from coupled identification device 1. In one embodiment, memory 212 may include a database of codes used for matching with code 202. Such stored codes may be provided to or received from processor 210. In one embodiment, memory 212 could be a conventional read-writable memory known to one of ordinary skill in the art. By way of example only, memory 212 may be non-transitory computer readable medium. In one embodiment, memory 212 may include computer executable instructions, which when executed by processor 210 cause it to carry out or perform various features and functionalities of embodiments in this disclosure, e.g., operations discussed with respect to FIG. 3.

Power source 226 may be a battery pack, or other types of power sources for on-board electronic controller module 104 (1) known to one of ordinary skill in the art.

On-board electronic controller module 104(1) may optionally include LED display 228. By way of example only, LED display 228 may indicate that power source 226 has been applied to on-board electronic controller module 104(1), a communication link (e.g., RF link) between on-board electronic controller module 104(1) and control console 110 has been established, a status of relays in on-board electronic controller module 104(1), a CAN bus traffic indicator indicating data traffic on a wired CAN bus of machine 102(1), etc. Alternatively, LED display 228 may be optional, or may be similar to display 114 discussed with respect to FIG. 1.

On-board transceiver 214, interchangeably referred to herein as a "transceiver 214," includes a transmitter and a receiver, in addition to other circuitry such as modulators, de-modulators, encoders, decoders, quantizers, amplifiers, filters, equalizers, analog-to-digital converters (ADCs), digital-to-analog converters (DACs), and/or other communication circuitry, known to one of ordinary skill in the art. On-board transceiver 214 is configured to exchange (i.e., transmit and/or receive) message 118(1). In one embodiment, transceiver 214 may be capable of infrared (IR) communications, acoustic communications, electro-acoustic communications, Bluetooth communications, or other types of communications in a particular communication frequency or frequency band of the electromagnetic or acoustic spectrum. In one embodiment, transceiver 214 may be two or more individual transceivers adapted to communicate with control console 110 or other transceivers over RF, IR, or other communication bands. For example, one of such transceivers may be an RF type transceiver and the other may be an IR type transceiver. In one embodiment, on-board transceiver 214 supports J1939 CAN communications, known to one of ordinary skill in the art. In one embodiment, on-board transceiver 214 may use 80 (hexadecimal) as its identification when sending all J1939 messages to components 108(1) of machine 102(1) with a destination address of A2 (hexadecimal). In one embodiment, on-board transceiver 214 may transmit such J1939 messages over a wired path to one or more components 108(1) at a J1939 bit rate of 250 kb/s, although other bit rates may be used. In one embodiment, on-board transceiver 214 is configured to send updated feedback data to control console 110. Such feedback data may relate to a position, speed, orientation, or other location or diagnostic parameters associated with machine 102(1). Such feedback data may be sent, for example, at time periods of less than or equal to 250 ms. In one embodiment, on-board transceiver 214 includes a standard polarity threaded Neill-Concelman (TNC) style (female) RF connector. Such TNC style connector may have sufficient room around the connector to hand tighten an antenna cable connector thereto.

In one embodiment, on-board transceiver 214 is configured to exchange message 118(1) with control console 110. Message 118(1) may be communicated over wireless, optical (e.g., line of sight), acoustic, electro-optical, or other types of communication channels known to one of ordinary skill in the art. By way of example only, message 118(1) may include a plurality of messages 200(1)-200(m), where the index 'in' is a positive integer. Messages 200(1)-200(m) may be exchanged as communication signals between transceiver 214 and control console 110, as indicated for example, using bi-directional arrows between transceiver 214 and control console 110. For example, such signals may be radio frequency (RF) signals. Messages 200(1)-200(m) may include information in the form of digital packets. Such digital packets may be encrypted for secure communication between control console 110 and machines 102(1)-102(n), as may be contemplated by one of ordinary skill in the art. Alternatively, messages 200(1)-200(m) may be analog messages. Further, it is to be noted that in this disclosure, the prefixes "first", "second", "third", etc., for messages 200(1)-200(m) are meant for purposes of identification/nomenclature of messages 200(1)-200(m), and are not related to any particular order in which messages 200(1)-200(m) may be exchanged between transceiver 214 of on-board electronic controller module 104(1) and control console 110. For example, one or more messages 200(1)-200(m) may be exchanged in parallel, serially, or at random windows of time periods. Furthermore, one or more messages 200(1)-200(m) may be duplicate messages intentionally exchanged for redundancy purposes.

In one embodiment, message 200(1) may be a first wireless message that is transmitted by control console 110 and received by on-board electronic controller module 104(1) at transceiver 214. Message 200(1) may include a second identification code 230(1') from control console 110. Message 200(1) may be processed at processor 210, as discussed with respect to FIG. 3.

In one embodiment, message 200(2) may be a second wireless message that is transmitted by transceiver 214, and received by control console 110. Message 200(2) may include information regarding whether first identification code 202 and second identification code 230(1') match or not. Such matching is carried out, for example, by processor 210, as discussed with respect to FIG. 3.

In one embodiment, message 200(3) may be a third wireless message that is transmitted by control console 110. Message 200(3) may be transmitted upon a verification that first identification code 202 and second identification code 230(1') match. Message 200(3) may include control information to control machine 102(1). Such control information may be generated, for example, by activation of one or more control buttons 116(1)-116(k) on control console 110.

In one embodiment, message 200(4) may be a fourth wireless message transmitted by transceiver 214. Message 200(4) may include one or more results of a diagnostic test carried out by control console 110 at a start-up of machine 102(1). Such diagnostic test may include evaluating various parameters of machine 102(1), for example before exchanging control signals, or during operation of machine 102(1). Such parameters may include grade angle, temperature, fuel content, visibility, humidity, wheel motion, position, machine arm position, engine speed, lights and other electrical circuitry of machine 102(1), gear position, brake positions, emergency parameters, fire suppression, remote control activity status, lockout parameters, joystick positions, and other electrical or mechanical parameters for machine 102(1), as known to one of ordinary skill in the art. For example, such parametric information may include information related to machine 102(1) conveyed or received using control buttons 116(1)-116(k) on the layout panel of control console 110.

Additional messages 200(5)-200(m) may be exchanged between machine 102(1) and control console 110. Messages 200(5)-200(m) may include start-up information for machine 102(1), diagnostics information of machine 102(1), values of various control parameters for control system 100 (e.g., relative positions of machines 102(1)-102(n), alert messages, turn-off or stop messages for machine 102(1), etc.

Control console 110 includes a transceiver 216, an identification device reader 218, a processor 220, a memory 222, and a power source 230, in addition to other electronic components such as connectors, relays, etc. These components of control console 110 may be connected to each other via one or more internal buses, as illustrated by solid connecting lines. FIG. 2 again illustrates display 114, control buttons 116(1)-116(k), selection device 112, and one or more identification devices 1'-n', as discussed with respect to FIG. 1. In one embodiment, control console 110 may be communicatively coupled to an external supplier or vendor 224. Control console 110 may use vendor 224 for placing an order for a faulty component, e.g., identification device 1 and its pair. Alternatively, vendor 224 may execute other serviceability agreements for replacing identification device 1 and its pair.

It is to be noted that in the embodiment illustrated in FIG. 2, selection device 112 is at a time coupled to only one identification device (e.g., identification device 1'). This is indicated by a solid connector line between selection device 112 and identification device 1'. However, in different embodiments, selection device 112 may be coupled to other identification devices (e.g., identification devices 2'-n'), as indicated by broken arrow lines between selection device 112 and identification devices 2'-n'. For example, control console 110 may have identification devices 1'-n' associated with a plurality of machines (e.g., machines 102(1)-102(n)), such that identification devices 1'-n' are removeably coupled to control console 110 and are selected based on one of the plurality of machines (e.g., machine 102(1)) that is to be controlled by control console 110. Such election of one identification device out of the plurality of identification devices 1'-n' may be made using selection device 112, or by manually attaching identification devices 1'-n' one by one to a receptacle or slot in control console 110.

Identification devices 1'-n' each include identification codes 230(1')-203(n'), respectively. Exactly one of codes 230(1')-230(n') matches, or is same as, code 202 on identification device 1. The matched code on one of identification devices 1'-n' may be referred to herein as a "second identification code." Likewise, other non-matching codes in codes 230(1')-230(n') may match other codes (not shown) on other identification devices 2-n of machines 102(2)-102(n), respectively or otherwise. Similar to code 202, codes 230(1')-230(n') may be hard-coded onto identification devices 1'-n', respectively. In one embodiment, codes 230(1')-230(n') may each be an x-bit binary value, where 'x' is a positive integer. For example, codes 230(1')-230(n') may each have an 8-bit binary value. In one embodiment, codes 230(1')-230(n') may be formed of a physical pattern (e.g., imprinted silicon pattern) inside identification devices 1'-n', respectively. The physical pattern alters an incident electromagnetic or electro-acoustic wave from an external reader (e.g., identification device reader 218). In one embodiment, codes 230(1')-230(n') may be formed by permanent arrangements of magnetization states of dipoles inside identification devices 1'-n', respectively. Likewise, codes 230(1')-230(n') may be any form of permanent state machines that are not programmable externally, but may be read externally to yield a numeric or an alphanumeric value. Codes 230(1')-230(n') are internal to identification devices 1'-n' such that any physical tampering of identification devices 1'-n' will render identification devices 1'-n' useless or damaged. As noted above, in one embodiment, identification devices 1'-n' may be passive devices. Alternatively, identification devices 1'-n' may be active devices. When identification devices 1'-n' are active devices, they may optionally include a battery or power source (not shown), or may be powered by power source 230. In this example, codes 230(1')-230(n') may be transmitted by an antenna in/on identification devices 1'-n' to identification device reader 218 of control console 110. In one embodiment, identification devices 1'-n' may be, or may include, an RFID chip or tag, an RFID memory card, a compact disc (CD) medium, or other types of permanent read only memory media. Identification devices 1'-n' may optionally include an input-output interface (e.g., a universal synchronous bus (USB) interface) for insertion in one or more slots (not shown) of control console 110. When an input-output interface is included, a security procedure may be implemented (e.g., a security authentication feature or an algorithm) that prevents a user from tampering with the code using the input-output interface. Alternatively, identification devices 1'-n' may be mechanically coupled externally to control console 110 via a receptacle or a casing on control console 110. For example, identification devices 1 may include pins on an external surface thereof for latching onto the receptacle. Regardless of how identification devices 1'-n' may be attached to control console 110, identification devices 1 may be removable therefrom without much effort and without opening control console 110. In this sense, identification devices 1'-n' may be external to control console 110. Identification devices 1'-n' nay be physically contactless with other internal components of control console 110. The term "contactless" relates to lack of hard wired electrical contact or connection between control console 110 and identification devices 1'-n'. Upon insertion or removable coupling to control console 110, identification devices 1'-n' are readily accessible by control console 110. For example, such access may include reading codes 230(1')-230(n') and/or other information from identification devices 1'-n' wirelessly without contact. Alternatively, in one embodiment, identification devices 1'-n' may be internal to control console 110. Further alternatively, codes 230(1')-230(n') may be available to control console 110 in software (e.g., via memory 222) from vendor 224.

Transceiver 216 includes a transmitter and a receiver, in addition to other circuitry such as modulators, de-modulators, encoders, decoders, quantizers, amplifiers, filters, equalizers, ADCs, DACs, and other communication circuitry, known to one of ordinary skill in the art. Transceiver 216 at control console 110 is configured to exchange (i.e., transmit and/or receive) message 118(1) including messages 200(1)-200(m), as discussed above. In one embodiment, transceiver 216 may be capable of infrared (IR) communications, acoustic communications, electro-acoustic communications, Bluetooth communications, or other types of communications in a particular communication frequency or frequency band of the electromagnetic or acoustic spectrum. In one embodiment, transceiver 216 may be two or more individual transceivers adapted to communicate with on-board electronic controller module 104(1) or other transceivers over RF, IR, or other communication bands. For example, one of such transceivers may be an RF type transceiver and the other may be an IR type transceiver. In one embodiment, transceiver 216 may transmit or receive messages 118(1)-118(n) for machines 102(1)-102(n) that are in a range of 400 m, although transceiver 216 may be designed for operability over other distances. In one embodiment, transceiver 216 is configured to carry out link initiation procedures to establish the communication linked (e.g., an RF link) between control console 110 and on-board electronic controller module 104(1). Such link initiation procedures are discussed with respect to FIG. 3.

In one embodiment, identification device reader 218 is configured to transmit a wireless signal (not shown) to identification devices 1'-n' to read codes 230(1')-230(n'). Identification device reader 218 may be referred to interchangeably as a "second identification device reader". In one example, identification device reader 218 may be an RFID reader. This RFID reader transmits an RF signal to identification devices 1'-n' to read codes 230(1')-230(n'). Internal circuitry of identification device reader 218 is known to those of ordinary skill in the art, and will not be described herein. Alternatively, when identification devices 1'-n' are active devices, codes 230(1')-230(n') may be wirelessly transmitted to identification device reader 218.

Processor 220 is a general purpose processing unit, e.g., a microprocessor. Processor 220 may be configured, adapted, or programmed to receive and process read codes 230(1')-230(n') from identification device reader 218 at one of its input lines or pins. In addition, processor 220 may be configured, adapted, or programmed to carry out additional steps. Processor 220 may execute one or more instructions stored in memory 222, or received via message 118(1), which cause it to carry out or perform various features and functionalities of embodiments in this disclosure, e.g., operations discussed with respect to FIG. 3. By way of example only and not by way of limitation, processor 210 may be an INTEL® PENTIUM® processor provided by Intel, Inc. of Santa Clara, Calif.

Memory 222 is coupled to processor 220. In one embodiment, memory 222 includes a database of codes used for matching with code 202. Such stored codes may be provided to or received from processor 220 for comparison. In one embodiment, memory 222 could be a conventional read-writable memory known to one of ordinary skill in the art. By way of example only, memory 222 may be non-transitory computer readable medium. In one embodiment, memory 222 may include computer executable instructions, which when executed by processor 220 cause it to carry out or perform various features and functionalities of embodiments in this disclosure, e.g., certain operations discussed with respect to FIG. 3.

Power source 230 may be a battery pack, or other types of power sources known to one of ordinary skill in the art. In one embodiment, power source 230 includes sufficient power rating to enable hand-held mobile operation of control console 110 in control system 100.

It is to be noted that one or more blocks showing the internal details of identification device 1, on-board electronic controller module 104(1), and control console 110 may be combined. For example, a single hardware component may carry out the functionalities associated with two or more blocks. Further, these blocks may be implemented as a system on a chip (SOC), a field programmable gate array (FPGA), or an application specific integrated circuit (ASIC), as may be contemplated by one of ordinary skill in the art reading this disclosure. Furthermore, the arrangement and relative orientation of various blocks and components is exemplary only, and other arrangements and relative orientations of these blocks may exist, as may be contemplated by one of ordinary skill in the art reading this disclosure.

INDUSTRIAL APPLICABILITY

Embodiments of the present disclosure provide methods that control machines 102(1)-102(n) remotely. Such remote control may be carried out by messages 118(1)-118(n) exchanged between machines 102(1)-102(n) and control console 110. Additional embodiments carry out such exchange of messages 118(1)-118(n) based upon unique pairing of code 202 and another identification code in the set of identification codes 230(1')-230(n'). While these methods offer control system 100 for machines 102(1)-102(n), such as motor graders, wheel loaders, wheel dozers, track type tractors, track loaders, etc., any control system 100 that includes paired identification devices for controlling output of machines 102(1)-102(n) may benefit from them.

Generally and conventionally, identification devices 1-n are inside on-board electronic controller modules 104(1)-104(n), respectively. Identification devices 1-n are uniquely paired with their respective counterpart devices at a manufacturing site. As discussed above, if one or more of identification devices 1-n, or respective on-board electronic controller modules 104(1)-104(n) are faulty, control console 110 having the second identification device of the pair (e.g., one of identification devices 1'-n') has to be replaced too. In another scenario, one or more of identification devices 1-n may be lost or misplaced, causing the second identification device of the pair to be replaced too. Alternatively, one may need to open up defective identification device 1 inside on-board electronic controller module 104(1) leading to a void warranty of on-board electronic controller module 104(1) due to tampering. This increases costs of operation of control system 100, and components thereof. This further creates an inflexible serviceability strategy of components of control system 100. Since identification devices 1-n are removeably coupled externally to on-board electronic controller module 104(1), the embodiments advantageously allow flexible "on-the-fly" replacement of defective identification devices 1-n and/or defective on-board electronic controller modules 104(1)-104(n) without causing problems and inflexibilities associated with conventional control systems to control machines 102(1)-102(n).

Figure 3:
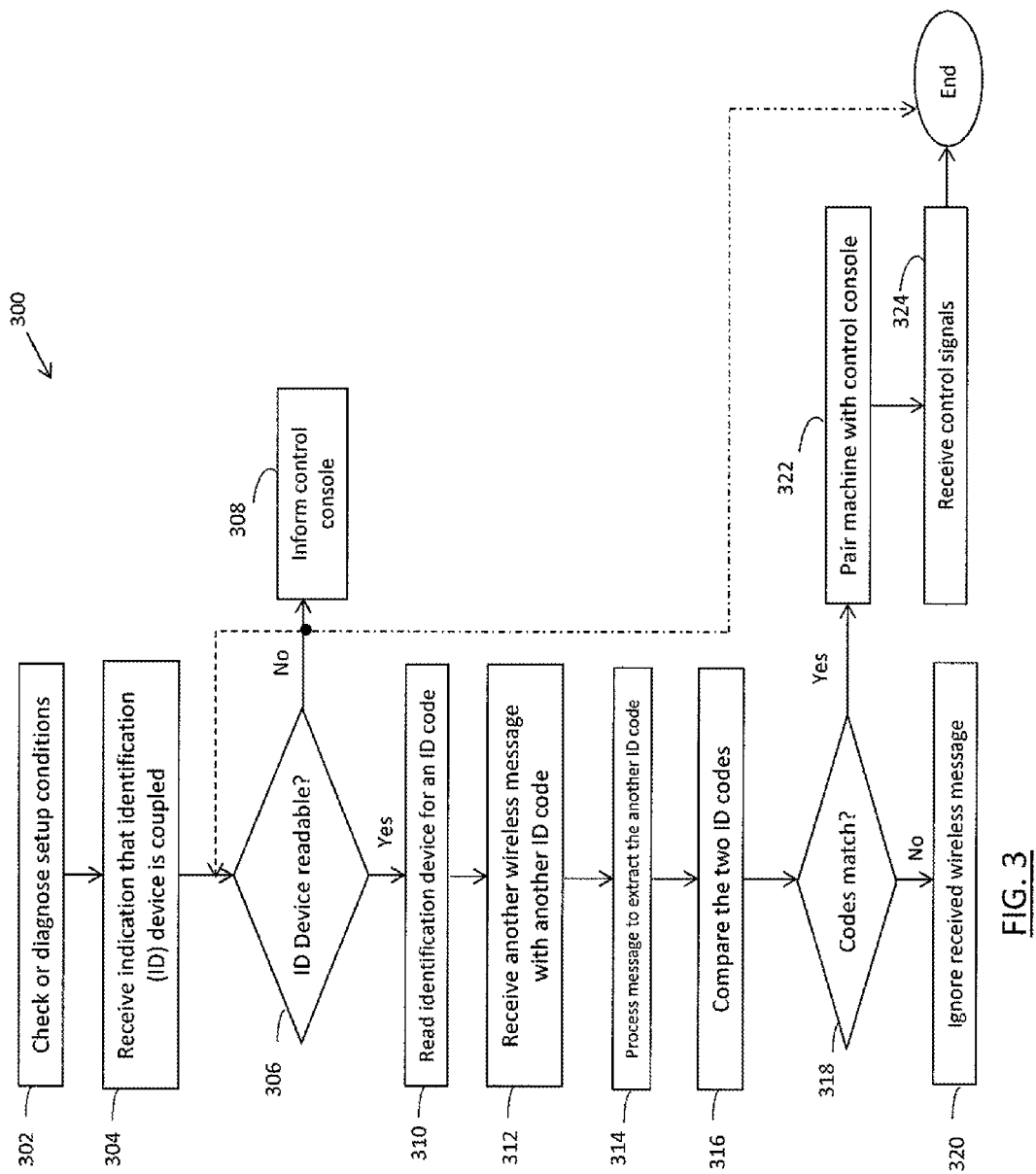
FIG. 3 presents a flow chart depicting a machine control method, in accordance with an embodiment.

FIG. 3 presents a flow chart depicting a machine control method 300, in accordance with respective embodiments of the present disclosure. In one embodiment, one or more processes in method 300 may be carried out by on-board electronic controller module 104(1) in/on machine 102(1), e.g., at processor 210, identification device reader 206, transceiver 214, etc. In one embodiment, one or more processes may be carried out by control console 110, e.g., by processor 220, identification device reader 218, transceiver 216, and the like. In one embodiment, in method 300, one or more processes, or sub-processes thereof, may be carried out cooperatively by both on-board electronic controller module 104(1) and control console 110 of control system 100, e.g., by respective components thereof. Further, in one embodiment, processes in method 300 may be transferable between on-board electronic controller module 104(1) and control console 110 of control system 100. Furthermore, one or more processes may be skipped or combined as a single process, and the flow of processes in method 300 may be in any order not limited by the specific order illustrated in FIG. 3. For example, one or more processes may be moved around in terms of their respective orders, or may be carried out in parallel.

Referring now to FIG. 3, method 300 may begin in an operation 302, where set-up conditions of control system 100 are checked or diagnosed. It is to be noted that although operation 302 is illustrated as the first step of method 300, operation 302 may be carried out later, for example, after operation 322 discussed below. In one embodiment, to carry out such a checking or diagnosis operation, transceiver 214 may receive one or more messages 200(1)-200(m) from transceiver 216 of control console 110. For example, one or more of messages 200(1)-200(m) may form, or may include, a diagnostic test on identification device 1. The received messages include information or signals to check or diagnose whether machine 102(1) and its components (e.g., on-board electronic controller module 104(1)) are powered on. Based upon such checking, transceiver 214 may receive further messages that check whether on-board electronic controller module 104(1) is responding to emergency messages from control console 110. Results of such checking are transmitted back to control console 110, e.g., to transceiver 216 for processing by processor 220. Additional messages for checking may be received at transceiver 214 to determine status of parking brakes, lockout conditions, or other parameters. Based upon processing of such diagnostic test messages by processor 210, transceiver 214 transmits one or more results of the diagnostic test back to control console 110 in a wireless message (e.g., fourth wireless message 200(4)).

In an operation 304, transceiver 214 may receive another message (e.g., one or more messages 200(1)-200(m)) from control console 110 to determine whether identification device 1 is coupled to on-board electronic controller module 104(1). Alternatively, in operation 304, processor 210 may receive an indication signal from identification device reader 206 that identification device 1 is coupled to on-board electronic controller module 104(1). In one embodiment, such indication of identification device 1 being coupled may be checked periodically (e.g., every second) by processor 210. Based upon the indication signal (e.g., wireless signal 208), processor 210 may instruct transceiver 214 to send a wireless message (e.g., one or more messages 200(1)-200(m)) to control console 110 indicating whether or not identification device 1 is coupled to on-board electronic controller module 104(1).

In an operation 306, processor 210 determines whether identification device 1 is readable or not. For example, processor 210 may receive a signal from identification device reader 218 indicating that identification device 1 is an RFID chip with code 202 stored on it. Based upon such indication, processor 210 infers that identification device 1 is readable. Alternatively, in operation 306, transceiver 214 may receive a wireless message from processor 220 of control console 110 that requests information regarding whether or not identification device 1 is readable. Based upon such received message from processor 220, processor 210 may initiate a checking procedure for identification device reader 206 to determine readability of identification device 1. If identification device 1 is found to be unreadable, processor 210 performs an operation 308 discussed below. Alternatively, additionally, or optionally processor 210 may simply end the process of method 300, as indicated by a chained arrow line in FIG. 3. Still alternatively, additionally, or optionally, processor 210 may continue checking for other identification devices that may have been removeably coupled to on-board electronic controller module 104(1).

In an operation 308, processor 210 may instruct transceiver 214 to transmit a wireless message (e.g., one or more messages 200(1)-200(m)) to control console 110 indicating whether or not identification device 1 is readable. For example, if processor 210 determines that identification device 1 is unreadable, control console 110 upon receipt of the wireless message may contact vendor 224 to service or replace identification device 1 and its corresponding pair at control console 110.

In an operation 310, processor 210 configures identification device reader 206 to read code 202 from identification device 1. In one embodiment, such a read may be carried out wirelessly using signal 208. The read code 202 may be stored in memory 212 for processing by processor 210. For example, processor 210 may receive the read code 202 from identification device reader 206. Further in operation 310, code 202, by virtue of its physical presence, may modify the electromagnetic field of wireless signal 208. This modification is then read by identification device reader 206 and deciphered by processor 210 to reveal a value of code 202. Alternatively, when identification device 1 is an active device, code 202 may be wirelessly transmitted by identification device 1 to identification device reader 206. Identification device reader 206 may then forward the read code to processor 210 for processing. In one embodiment, such reading of identification device 1 by identification device reader 206 may be carried out periodically (e.g., every second). Alternatively, in one embodiment, such reading may be carried out as and when appropriate.

In an operation 312, transceiver 214 of on-board electronic controller module 104(1) receives a wireless message (e.g., first wireless message 200(1)) from control console 110. The wireless message may include another or a second identification code (e.g., code 230(1')) associated with identification device 1' on control console 110. As noted above, the second identification code in the wireless message may be received as a digitized data packet. Further, the data packet may be encrypted using conventional encryption techniques. In one embodiment, control console 110 may transmit the first wireless message (e.g., first wireless message 200(1)) with the second identification code (e.g., one of codes 230(1')-230(n')).

In an operation 314, transceiver 214 sends the received wireless message to processor 210. Processor 210 processes the wireless message to extract the identification code (e.g., code 230(1')). For example, transceiver 214 may demodulate and decrypt the wireless signal and then send it to processor 210 as binary data for processing. In one embodiment, processor 210 may, for example, temporarily store the extracted second identification code to memory 212.

In an operation 316, processor 210 compares the second identification code received in the wireless message with the first identification code (e.g., code 202) read from identification device 1 in operation 310. For example, processor 210 may access memory 212 where the first and the second identification codes may have been previously stored. In one embodiment, processor 210 may access memory 212 to obtain computer executable instructions that implement an algorithm to compare the two codes (e.g., code 202 and code 230(1')).

In an operation 318, processor 210 may execute the computer executable instructions in memory 212 to determine if the first and the second identification codes match. For example, processor 210 may carry out a bit by bit comparison of identification code 202 with identification code 230(1'). The result of such a comparison may be a binary or Boolean variable (e.g., a bit '0' or a bit '1'). This result may be stored in memory 212 by processor 210. The value of such a binary variable may indicate whether or not the first and the second codes match. For example, a bit value '0' may indicate that the first and the second identification codes do not match. Likewise, a bit value '1' may indicate that the first and the second identification codes match.

In an operation 320, if the first identification code and the second identification code do not match, processor 210 may ignore the received wireless message containing the second identification code. Additionally or optionally, processor 210 may send another wireless message (e.g., wireless message 200(m)) to transceiver 216 of control console 110 to indicate that the first and the second codes do not match. For example, when the first and the second identification codes do not match, processor 210 may infer that the first wireless message came from another device (e.g., another machine 102(2) or another control console) that may be ignored. Alternatively, processor 210 may receive additional messages from control console 110 including other codes (e.g., one or more of identification codes 230(2')-230(n')) to carry out further comparisons similar to operation 318.

However, in an operation 322, if the first and the second identification codes match, processor 210 may process the first wireless message to send another wireless message (e.g., second wireless message 200(2)) to transceiver 216 of control console 110. This wireless message may indicate to control console 110 that a result of the comparison in operation 316 was a match between the first and the second identification codes. Based on this wireless message, processor 210 indicates that identification device 1 and identification device 1' form a unique pair. For example, processor 210 determines that a value of code 202 is equal to a value of code 230(1'), and on-board electronic controller module 104(1) may be securely linked for control by control console 110 wirelessly. Likewise, processor 220 processes the match indication received from transceiver 214 to lock identification device 1' and identification device 1 as a unique pair. Such a lock may include selection device 112 to be electrically or wirelessly connected to identification device 1' while ignoring connection(s) with other identification devices 2'-n'.

In an operation 324, transceiver 214 may receive one or more control signals from control console 110. The control signals include information to carry out remote controlled operation of machine 102(1) using control console 110, e.g., in a harsh environment where control system 100 is deployed. The control signals may be sent as additional wireless messages (e.g., third wireless message 200(3)) to control operation of machine 102(1). Processor 210 may process the received wireless messages to actuate various mechanisms in machine 102(1). For example, the control signals received by on-board electronic controller module 104(1) may be related to functionalities of one or more control buttons 116(1)-116(k). Control console 110 may transmit these messages to move or otherwise orient machine 102(1), or parts thereof, for standard operation of machine 102(1). For example, an arm of machine 102(1) may be moved on the ground to dig. The control signals may be updated based on continuous feedback to control console 110 from on-board electronic controller module 104(1) using message 118(1).

It is to be noted that although method 300 above is discussed to include operations of a process carried out by on-board electronic controller module 104(1), in an alternative embodiment, one or more operations may be carried out at control console 110. For example, processor 220 of control console 110 may receive code 202, carry out comparison of identification code 202 with identification codes 230(1')-230(n') to determine a match, and then pair on-board electronic controller module 104(1) with control console 110, etc.

As discussed elsewhere in this disclosure, one or more embodiments of the present disclosure provide a control system method to control a machine. Serviceability of remote control components of such a machine is enhanced using one or more embodiments discussed herein. For example, the external couplability of identification devices 1-n to on-board electronic controller modules 104(1)-104(n) on machines 102(1)-102(n) makes the identification devices 1-n easily removable. As a result, for example if only identification device 1 is faulty, the complete on-board electronic controller module 104(1) may not be replaced (as is conventional practice currently). Likewise, if on-board electronic controller module 104(1) has to be unmounted from machine 102(1) for servicing, machine 102(1) may still be remotely operable by externally coupling identification device 1 to a spare on-board electronic controller module. The spare on-board electronic controller module may be removed again once on-board-electronic controller module 104(1) returns from servicing. Further, if control console 110 is faulty, identification devices 1'-n' may simply be removed and coupled externally to a spare control console while control console 110 is being serviced. Since identification devices 1'-n' are uniquely paired with their counterpart identification devices 1-n, only two identification devices can be used to control a particular machine. This increases security of operation of machines 102(1)-102(n), for example, from a malicious user. Furthermore, when an identification device (e.g., RFID key or chip) is defective or becomes malfunctioning, a new unique pair of identification devices may be ordered from vendor 224. While waiting for the order to be completed by vendor 224, one of a spare pair of identification devices may be removeably coupled to on-board electronic controller module 104(1) and the other identification device of the pair may be coupled to control console 110 to carry out non-disruptive operation of machine 102(1). Therefore, various embodiments discussed herein provide an improved serviceability strategy for machine control systems.

The many features and advantages of the disclosure are apparent from the detailed specification, and, thus, it is intended by the appended claims to cover all such features and advantages of the present disclosure which fall within the true spirit and scope of the present disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A control system, comprising:
   a first and a second identification device storing a first and a second identification code, respectively;
   a control console;
   an on-board electronic controller module of a machine to which the first identification device is removeably coupled externally, the on-board electronic controller module comprising:
   a first identification device reader to read the first identification code, and
   a first processor, coupled to the first identification device reader, configured to:
   receive the first identification code from the first identification device reader,
   receive a first wireless message, including the second identification code, from the control console, compare the first and second identification codes, and process the first wireless message if the first and second identification codes match, wherein the control console comprises:
- a second identification device reader to obtain the second identification code, and
- a second processor in the control console, coupled to the second identification device reader, configured to:
  - receive the second identification code from the second identification device reader,
  - transmit the first wireless message, including the second identification code, to the on-board electronic controller module,
  - receive a second wireless message, including information regarding whether the first and second identification codes match, from the on-board electronic controller module, and
  - transmit a third wireless message to control the machine if the first and the second identification codes match.

2. The control system of claim 1, wherein at least one of the first and the second identification devices is a radio frequency identification (RFID) chip, and at least one of the first and the second identification device readers are RFID readers.

3. The control system of claim 1, wherein the control console comprises a plurality of identification devices associated with a plurality of machines, such that the plurality of identification devices are removeably coupled to the control console and are selected based on one of the plurality of machines to be controlled by the control console.

4. The control system of claim 1, wherein if the first identification device is unreadable by the first identification device reader, the first processor is further configured to:
- perform a diagnostic test on the first identification device, and
- indicate a result of the diagnostic test in a fourth wireless message to the control console.

5. The control system of claim 4, wherein when the result indicates that the first identification device is defective, the second processor is further configured to:
- order a replacement of the first identification device, and
- stop the control of the machine.

6. The control system of claim 1, wherein the first identification code in the first identification device is read wirelessly by the first identification device reader.

7. The control system of claim 1, wherein the on-board electronic controller module comprises an on-board transceiver.

8. The control system of claim 1, wherein the first identification device is a passive device.

* * * * *